Figure 8:
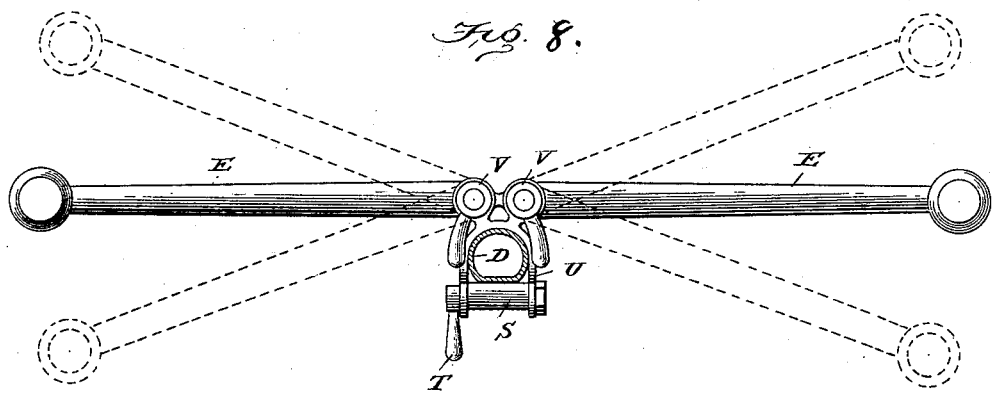

No. 633,746. Patented Sept. 26, 1899.
J. C. ANDERSON.
BICYCLE.
(Application filed Feb. 7, 1898. Renewed Mar. 9, 1899.)
(No Model.) 4 Sheets—Sheet 1.
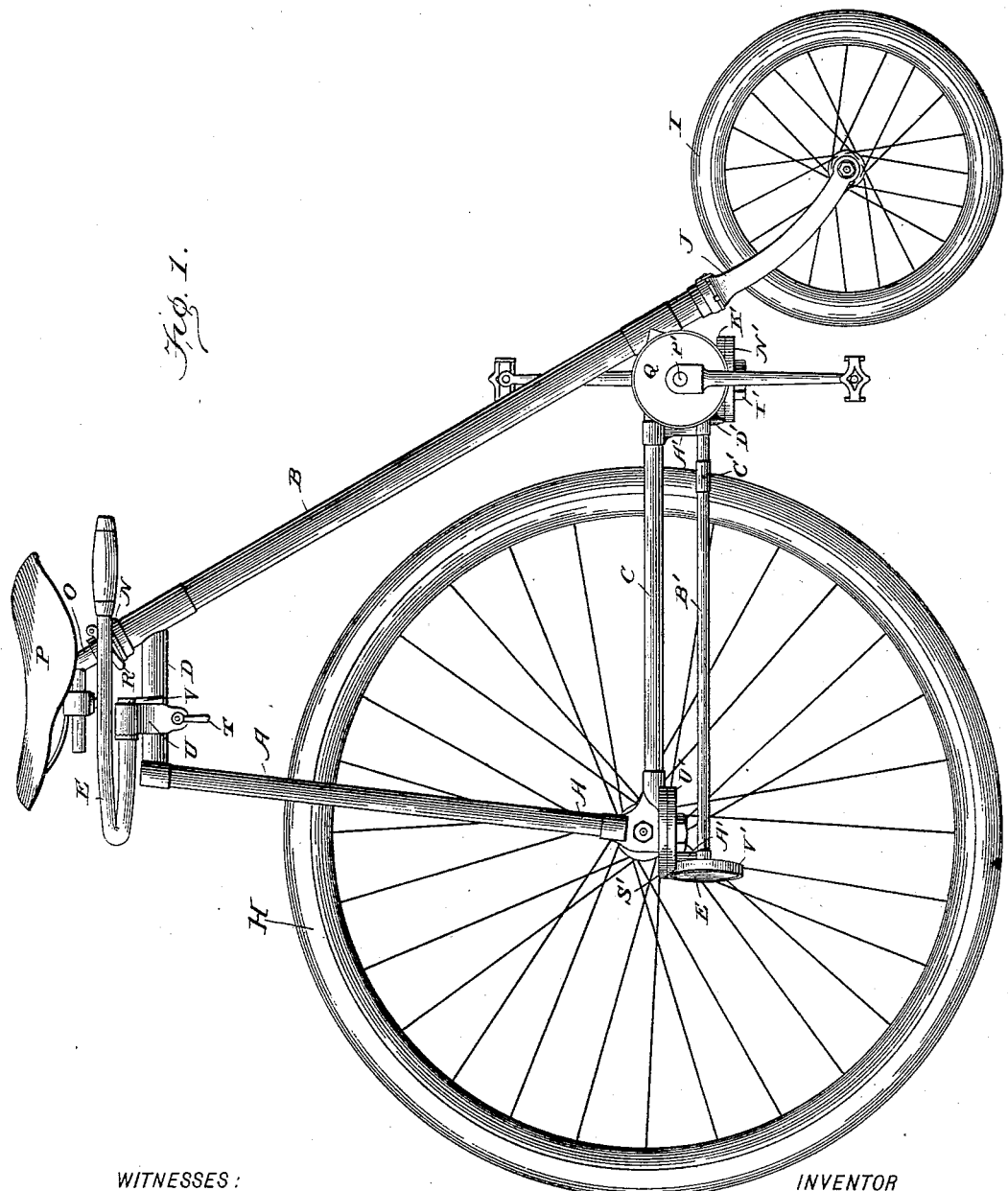
WITNESSES:
Edwin L. Bradford
N. Curtis Lammond
INVENTOR
Jas. C. Anderson
BY
ATTORNEY.

No. 633,746. Patented Sept. 26, 1899.
J. C. ANDERSON.
BICYCLE.
(Application filed Feb. 7, 1898. Renewed Mar. 9, 1899.)
(No Model.) 4 Sheets—Sheet 2.
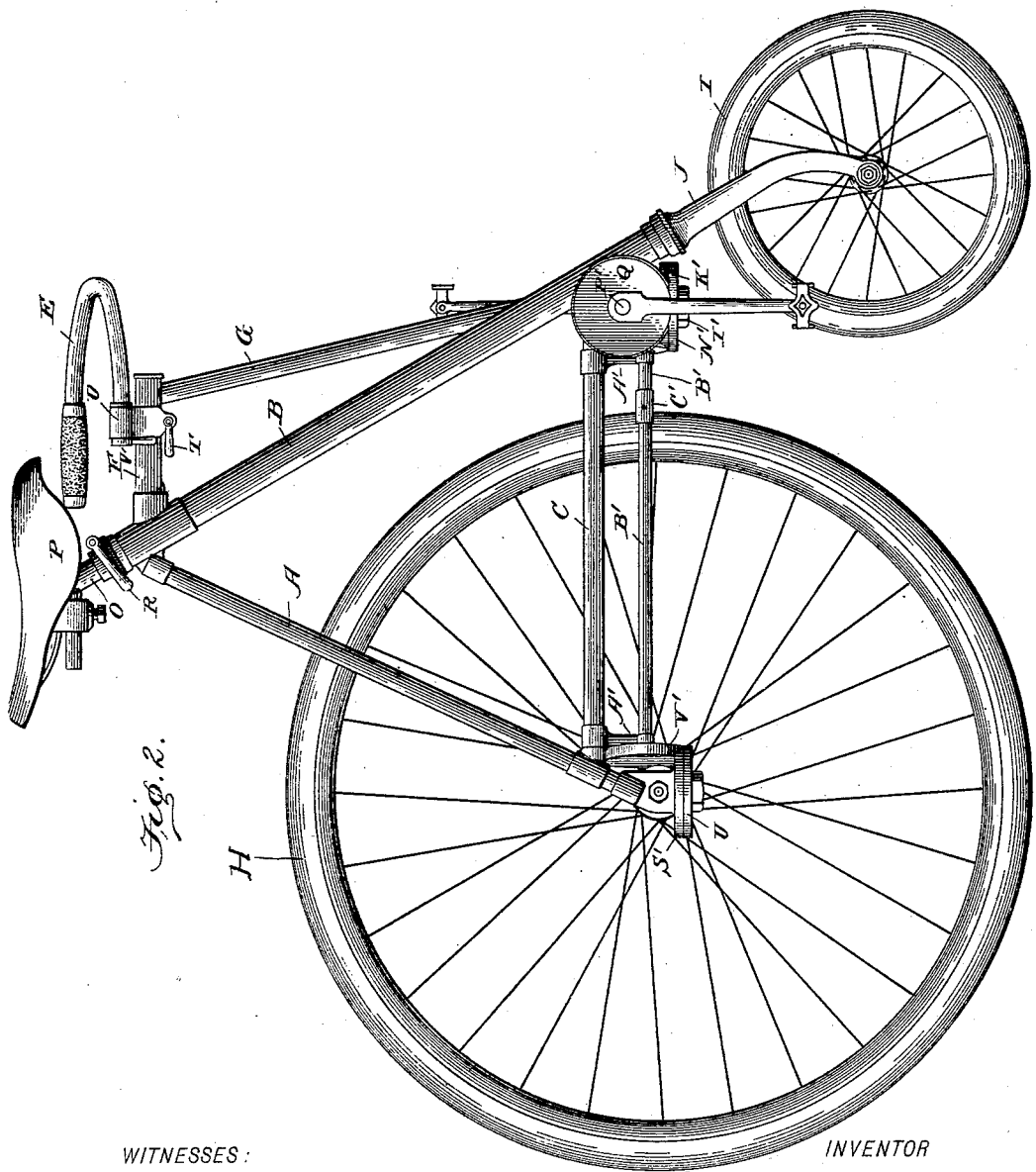
WITNESSES:
Edwin L. Bradford
N. Curtis Lammond
INVENTOR
Jas. C. Anderson
BY
ATTORNEY.

No. 633,746. Patented Sept. 26, 1899.
J. C. ANDERSON.
BICYCLE.
(Application filed Feb. 7, 1898. Renewed Mar. 9, 1899.)
(No Model.) 4 Sheets—Sheet 3.
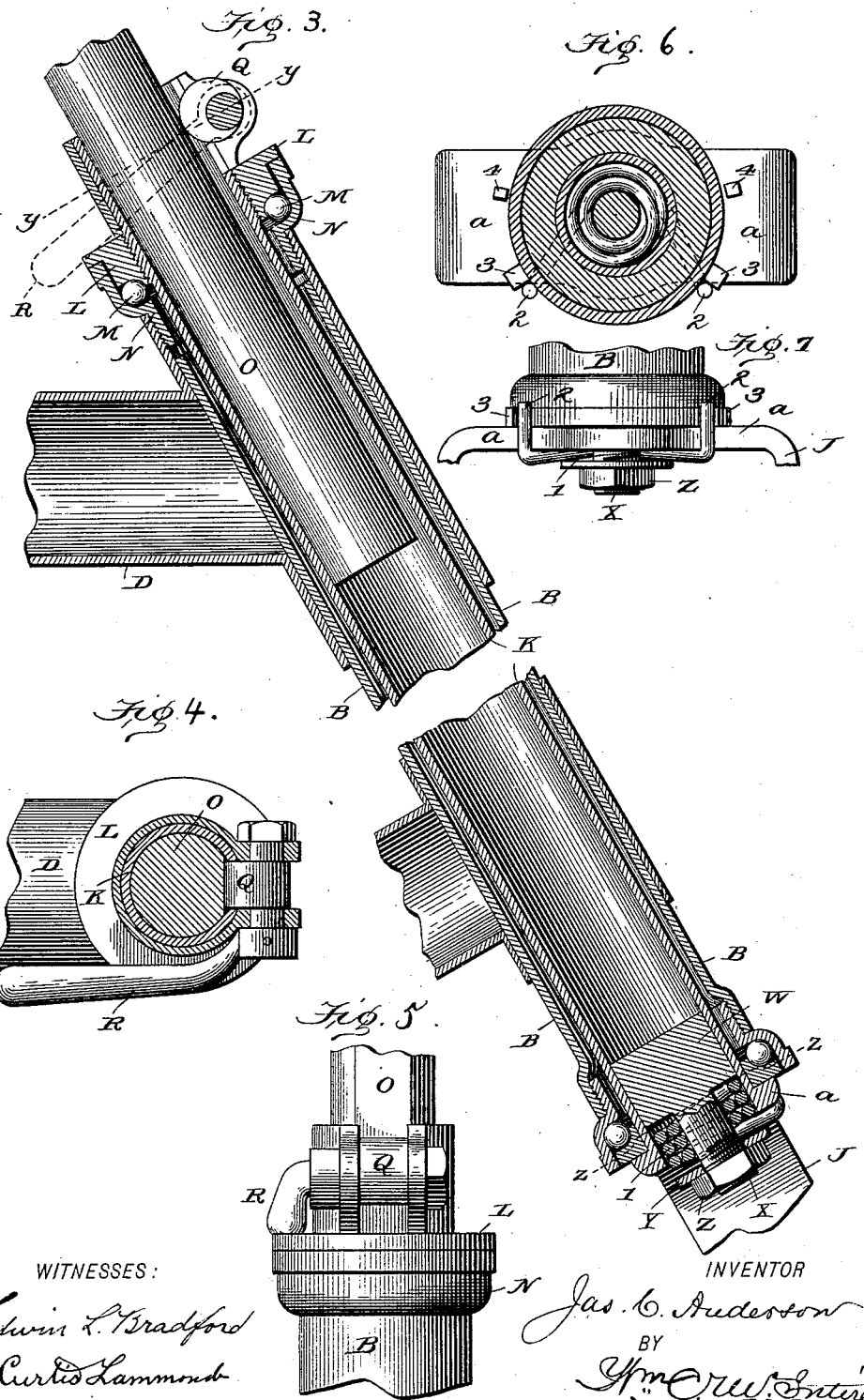
WITNESSES:
Edwin L. Bradford
N. Curtis Lammond
INVENTOR
Jas. C. Anderson
BY
Wm C. McIntire
ATTORNEY.

No. 633,746. Patented Sept. 26, 1899.
J. C. ANDERSON.
BICYCLE.
(Application filed Feb. 7, 1898. Renewed Mar. 9, 1899.)
(No Model.) 4 Sheets—Sheet 4.

WITNESSES:
Edwin L. Bradford
N. Curtis Hammond

INVENTOR
Jas. C. Anderson
BY
Wm. C. McIntire
ATTORNEY.

United States Patent Office.

JAMES C. ANDERSON, OF HIGHLAND PARK, ILLINOIS.

BICYCLE.

SPECIFICATION forming part of Letters Patent No. 633,746, dated September 26, 1899.

Application filed February 7, 1898. Renewed March 9, 1899. Serial No. 708,458. (No model.)

*To all whom it may concern:*

Be it known that I, JAMES C. ANDERSON, a citizen of the United States of America, and a resident of Highland Park, in the county of Lake and State of Illinois, have invented certain new and useful Improvements in Bicycles, (Case B,) of which the following is a specification.

My invention relates to certain new and useful improvements in bicycle construction; and it has for its object to provide a novel means for steering the bicycle.

In the present state of the art relating to vehicles of human locomotion propelled and controlled by the articulate force of the body applied to the machine it has for many years been recognized that what is known as the "safety-bicycle" is the best exemplification of vehicles for such locomotion. In this class of vehicles, however, it has been well understood that the machine was not in form and balance suited to the human anatomy, it being well known that the nearer such a machine approaches and articulates with the natural functions of the body the nearer it will approach acme in the art. In the present type of safety-bicycles the front wheel in order to clear the toes of the rider's feet must of necessity be located forward to such a degree that the rider to properly manipulate the machine is compelled to lean his body forward to an unnatural position. Moreover, the front wheel in this advanced forward position is heavy and unwieldy, requiring considerable effort on the part of the rider to hold and guide the same.

My invention has for its object to overcome the disadvantages recited and to provide a means for steering the machine through the medium of the saddle-post.

With this object in view my invention consists in attaching the front-wheel steering-fork to the saddle-post and so connecting the former with the front wheel that the said wheel may be readily swiveled by the movement of the rider upon the saddle.

My invention also consists in minor details of construction hereinafter more fully set forth and specifically claimed.

In order that those skilled in the art to which my invention appertains may know how to make and use the same, I will proceed to describe the construction and operation of the several parts, referring by letters and numerals to the accompanying drawings, in which—

Figure 9:
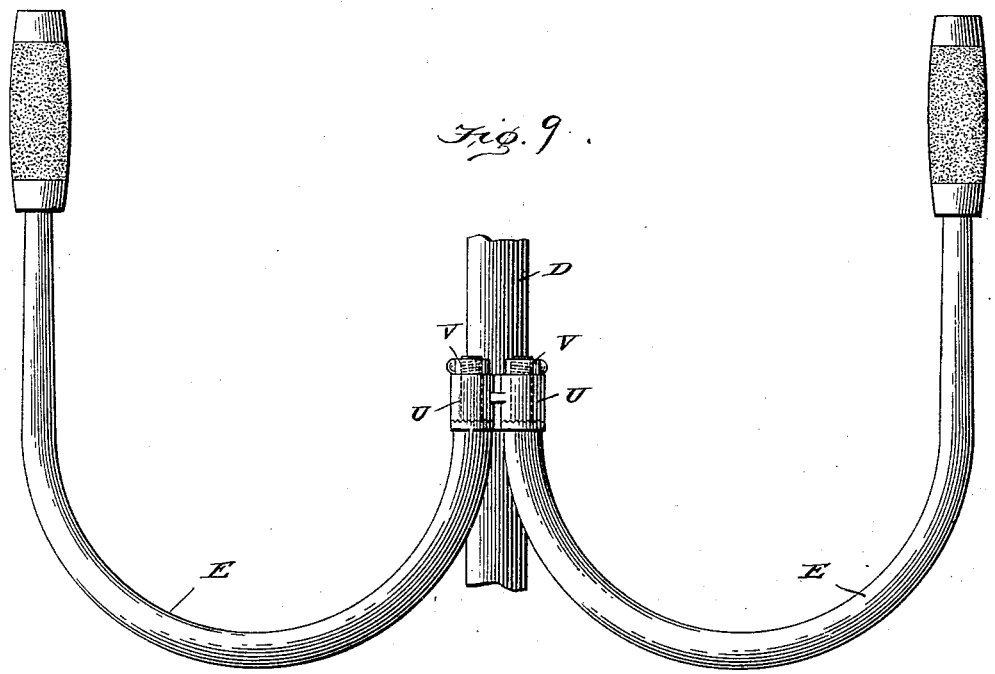
Figure 10:
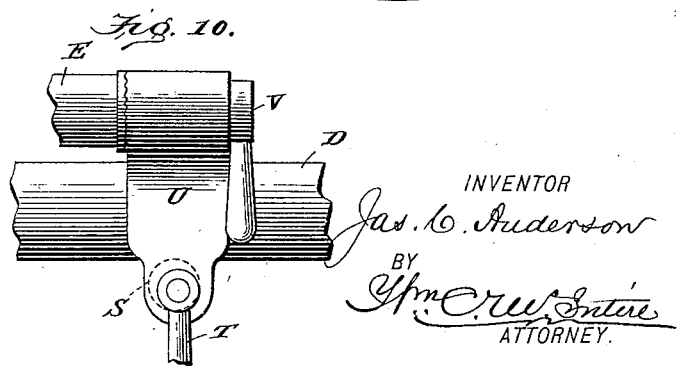

Figure 1 is a side elevation of a bicycle embodying my invention and especially adapted for use by women riders. Fig. 2 is a similar view of my improved bicycle as especially adapted for use by men. Fig. 3 is a longitudinal section of seat-post and steering-fork. Fig. 4 is a horizontal section on the line $y\ y$ of Fig. 3. Fig. 5 is a face or front view of clamp for securing or binding the seat-post. Fig. 6 is a horizontal section on the line $z\ z$ of Fig. 3. Fig. 7 is a face or front view of the steering-fork. Fig. 8 is a face or front view of the handle-bars, the dotted lines showing vertical adjustments. Fig. 9 is a plan view of the handle-bars, and Fig. 10 is a detail plan view showing means for clamping the handle-bars to the frame.

Similar letters and numerals of reference denote like parts in the several figures of the drawings.

A represents the rear fork of the frame, and B the seat-post tube, connected near their lower ends by the tube or brace C. In the construction shown at Fig. 1, which is designed especially for females, the tubes A and B are slightly separated at their upper ends and connected by a brace D, which constitutes a support for the forwardly-curved handle-bars E, and in the construction shown at Fig. 2, which is especially designed for use by men, the tubes A and B are joined at their upper ends, and a handle-bar-supporting tube F extends forwardly and is connected with a vertical tube G, which is rigidly attached at its lower end to the seat-post tube B. The handle-bars E in this case are secured to the tube F, and their curve or trend is rearward, as shown, while in the case of the construction shown at Fig. 1 the curve or trend of the handle-bars is forward for reasons in both cases which will be obvious.

The rear or driving wheel H is mounted in suitable ball-bearings at the point of junction between the tubes A and C in any well-known manner. The front wheel I is mounted in a fork J, the tubular stem or shank K of which extends up through the tube B and is secured in position by the screw ring or collar L, resting upon balls M in a ball-race nut N, threaded in the upper end of the seat-post tube B.

O is the seat-post, which supports the adjustable saddle P. The seat-post O is securely clamped in any desired adjustment to the front-wheel-fork shank or tube K by an eccentric Q, operated by a short lever or arm R, all secured in an obvious manner.

The handle-bars E are secured to the tube D or F, as the case may be, by an eccentric S, operated by a hand-lever T (see Figs. 7 and 10) in the lower ends of a supporting-block U, the upper portion of which is formed with two sleeves to receive the ends of the handle-bars, which latter are provided with fixed collars having serrated edges meshing with similar serrations on the ends of the sleeves. The projecting ends of the handle-bars are threaded, and lever-nuts V are employed to draw the serrations on the collars and sleeves into mesh when the handle-bars have been adjusted to any desired position.

The front wheel I is so connected with the lower ends of the fork J that the tread or point of contact between the wheel and the ground will be in rear of the point at which the oblique or vertical plane of the seat-post would strike the ground, and as a consequence there would occur a trailing or caster action in the wheel I which would tend to keep it in alinement with the track of the rear wheel H. The fork J is constructed in the usual manner, as shown in Fig. 3, to secure ball-bearing connection at the bottom end of tube B.

At the lower end of the tube or shank K, from which the fork J springs, I insert and sweat or otherwise secure in place a plug W, having a vertically-extending shank X, threaded to receive a washer Y and nut Z, which washer and nut hold in place around the shank X a spring 1, the two ends 2 2 of which (see Fig. 6) extend radially and diametrically and are then turned upwardly, so that they will bear against the front surface of the bridge $a$ of the steering-fork each side of the center, as clearly shown at Fig. 7. From this construction it will be seen that the spring-arms tend to hold the front fork in such position as to secure perfect alinement or track between the front and rear wheels and that when the fork-shank is rotated in one or the other direction it is rotated against the action of one or the other spring-arms 2 2, the reaction of which restores the fork to its normal position. Shoulders or spuds 3 3 are formed on the lower edge of the ball-race cup, which shoulders bear against and hold the respective spring-arms 2 2 (when the front fork is rotated away from one or the other of said spring-arms) in proper position to contact with the work when rotated in opposition to the said spring-arm.

When the machine is short-coupled and it is necessary to limit the degree of rotation of the front fork, shoulders or studs 4 4 are formed on the top surface of the fork-bridge $a$, adapted to contact with the rear faces of the shoulders or spuds 3 3 in an obvious manner, and consequently the reaction of the spring restores the fork and wheel to normal position. It follows from the construction described that the trailing action of the front wheel, supplemented by the action of the spring-arms 2 2, that the natural tendency of the front wheel is to travel in a straight line, and to divert it from such path must involve the action of the rider, while in the wheels as at present constructed the rider is required to exercise to a certain extent physical force to preserve the alinement of the two wheels as well as to steer or guide his machine. The rear faces of the shoulders 3 3 are designed to come in contact with shoulders or lugs 4 4, and thus limit the rotation of the fork J. This is designed to prevent the front wheel intersecting the path of motion of the cranks and pedals when the two wheels are short-coupled, as shown in the drawings, and it will be understood that when the length of the machine is reduced from the present dimensions by my improved construction it is not essential that the front or guiding wheel should be turned to so extreme a point to secure a short turn; but it will be understood that I do not wish to confine myself absolutely to so short a coupling as is shown, for it will be readily seen that I may throw the lower end of the tube B and front fork J sufficiently far forward as to permit the front wheel I to swivel entirely free of the crank and pedal.

The handle-bars E being adjustable, as stated, relatively to the saddle, the rider may occupy a perfectly natural position, and holding on to the handle-bars a pull or push upon one or the other in either direction will cause the body to swivel, as it were, and as a consequence the saddle and saddle-post will correspondingly swivel, turning the front-fork tube and front wheel also. This action and result is the most natural, because it is in harmony with the usual function of the body as controlled by the will in making variations of movements.

It will be seen that the steering-fork J and shank K lie in a plane coincident with the vertical trend of the tube A of the stationary frame, and consequently the point of contact of the periphery of the steering-wheel I with the ground is, practically speaking, directly under the weight of the rider as exerted through the saddle-post, and consequently the rotation of the saddle-post and steering-fork and shank will cause the steering-wheel to swivel or turn upon a pivoted point forward of and within the track of the rear wheel. This peculiarity of articulation between the frame of the machine and the steering-fork and shank relieves the rider from any special exertion in guiding the machine.

While I have shown the steering-wheel as pivotally mounted in the forward oblique tube B of the frame, it will be obvious that it may be similarly mounted within the rear tube A, in which case the position of the driving-wheel would be transposed accordingly.

Any suitable driving mechanism may be used. That which is shown constitutes the subject-matter of another pending application and need not be here described.

Having described the construction and operation of my improved bicycle, what I claim as new, and desire to secure by Letters Patent, is—

1. A bicycle embodying in its organization a frame composed of rigid tubes A, B, C, a driving-wheel H mounted in the rigid frame, a steering-wheel I mounted in a steering-fork pivoted within one of the oblique tubes of the frame, and a saddle rigidly connected with the pivoted shank of the steering-fork, the point of contact between the steering-wheel and the ground being substantially in line with the shank of the steering-fork, as described.

2. In a bicycle the saddle-post and steering-fork rigidly and adjustably secured together and pivoted within one of the oblique tubes of the frame, the steering-wheel connected with the steering-fork in a plane substantially coincident with the axis of motion of said fork, and a driving-wheel and rigid handle-bars secured in fixed relation with the frame of the machine, substantially as and for the purpose set forth.

3. In combination with the frame-tube B, seat-post O, and steering-fork shank K, constructed as described, the spring 1 confined within the lower end of the steering-fork shank and provided with diametric radial arms 2, 2, bearing against the front surface of the fork-bridge $a$, substantially as and for the purpose set forth.

4. In combination with the frame-tube B, saddle-post O, steering-fork and shank J, K, and spring 1, constructed as described, the spuds or shoulders 3, 3 on the ball-race cup to hold the arms 2, 2 respectively when the bridge $a$ of the steering-fork J rotates away from either of said spring-arms, substantially as hereinbefore described.

In testimony whereof I affix my signature in presence of two witnesses.

JAMES C. ANDERSON.

Witnesses:
N. CURTIS LAMMOND,
WALLACE MURDOCK.